(12) United States Patent
Yashiki

(10) Patent No.: US 10,347,194 B2
(45) Date of Patent: Jul. 9, 2019

(54) DISPLAY DEVICE AND METHOD FOR DRIVING SAME

(71) Applicant: Sharp Kabushiki Kaisha, Sakai, Osaka (JP)

(72) Inventor: Masafumi Yashiki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/539,792

(22) PCT Filed: Dec. 17, 2015

(86) PCT No.: PCT/JP2015/085412
§ 371 (c)(1),
(2) Date: Jun. 26, 2017

(87) PCT Pub. No.: WO2016/104340
PCT Pub. Date: Jun. 30, 2016

(65) Prior Publication Data
US 2017/0372668 A1 Dec. 28, 2017

(30) Foreign Application Priority Data
Dec. 26, 2014 (JP) ................................. 2014-264243

(51) Int. Cl.
*G09G 3/34* (2006.01)
*G09G 3/20* (2006.01)
(Continued)

(52) U.S. Cl.
CPC ..... *G09G 3/3413* (2013.01); *G02F 1/133621* (2013.01); *G09G 3/20* (2013.01);
(Continued)

(58) Field of Classification Search
None
See application file for complete search history.

(56) References Cited

U.S. PATENT DOCUMENTS

2008/0297465 A1* 12/2008 Kim ................. G02F 1/133621
345/102
2010/0177025 A1* 7/2010 Nagata ................ G02B 6/0028
345/76
(Continued)

FOREIGN PATENT DOCUMENTS

JP 2003060944 A 2/2003
JP 2007003848 A 1/2007
(Continued)

*Primary Examiner* — Joseph R Haley
(74) *Attorney, Agent, or Firm* — ScienBiziP, P.C.

(57) ABSTRACT

A display device (10) includes a light source (19), a light guide plate (18), a display panel (11), a panel driving unit that outputs, to the display panel (11), a signal for controlling a transmittance of each pixel of the display panel (11), and a light source driving unit (16). Light can pass through a back surface of the light guide plate (18), which is a surface opposed to the emission surface of the light guide plate (18). The light source driving unit (16) drives the light source (19) based on the lighting control data. In a case where an image is displayed when the light source (19) is in ON state, the display panel (11) displays a color image, by controlling, pixel by pixel, a transmittance of light that passes from the light source (19) through the emission surface of the light guide plate. In a case where an image is displayed when the light source (19) is in OFF state, the display panel (11) displays a transmitted light image that includes a transmitting region through which the back of the display device (10) can be seen, by controlling, pixel by pixel, a transmittance of light that passes through the back surface of the light guide plate (18) and is incident on the display panel (11).

5 Claims, 9 Drawing Sheets

(51) Int. Cl.
*G09G 3/36* (2006.01)
*G02F 1/1335* (2006.01)
*F21V 8/00* (2006.01)

(52) U.S. Cl.
CPC ............... *G09G 3/34* (2013.01); *G09G 3/36* (2013.01); *G09G 3/3607* (2013.01); *G02B 6/0043* (2013.01); *G02F 1/133528* (2013.01); *G02F 2001/133622* (2013.01); *G09G 2310/0235* (2013.01); *G09G 2330/021* (2013.01); *G09G 2340/08* (2013.01); *G09G 2360/16* (2013.01)

(56) References Cited

U.S. PATENT DOCUMENTS

2012/0001954 A1* 1/2012 Yamazaki ............ G09G 3/3406
 345/690
2014/0198123 A1 7/2014 Shibamiya et al.

FOREIGN PATENT DOCUMENTS

| JP | 3912999 B | 5/2007 |
| JP | 2014048490 A | 3/2014 |
| WO | 2009/122716 A | 10/2009 |

* cited by examiner

DISPLAY DEVICE AND METHOD FOR DRIVING SAME

TECHNICAL FIELD

The present application relates to a display device, and in particular, relates to a display device having a function that allows the back of the display screen to be seen therethrough, as well as a method for driving the same.

BACKGROUND ART

A display device such as, for example, a liquid crystal display device includes a backlight, and a display panel that displays an image by modulating the light of the backlight. A technique has been developed for realizing a variety of display performances in such a display device by turning-on/off the backlight in synchronization with the timings of displaying images.

The publication of the Japanese Patent No. 3912999 discloses, as an example of the same, a field sequential liquid crystal display device that realizes color display by using a backlight that is capable of emitting light of red, green, and blue colors in a time-division manner and a liquid crystal panel in combination so as to cause the switching of the liquid crystal elements and the light emission of the backlight to be synchronized with each other.

Further, JP-A-2003-60944 discloses that a field sequential liquid crystal display device is used in an electronic camera that has a monitor screen capable of displaying a picked-up object image. This liquid crystal display device has such a configuration that the display mode can be switched between a color display mode for performing color display by switching the turning on of the backlights of the respective colors of R, G, and B and the display of the liquid crystal shutter panel at a high speed, and a monochrome display mode for performing only the display by the liquid crystal shutter panel without turning on the backlights. This allows the electronic camera to operate with low electric power consumption even in a state where the display of the monitor screen is turned on.

PRIOR ART DOCUMENT

Patent Document

Patent Document 1: Japanese Patent No. 3912999
Patent Document 2: JP-A-2003-60944

SUMMARY OF THE INVENTION

Problem to be Solved by the Invention

In the above-described conventional display devices, the backlight control enables to improve the performance of the display devices. The control, however, is not intended to realize, for example, a novel display mode that provides eye-catching display, or various image display modes, in the display device.

Then, the present application discloses a display device that is capable of realizing the diversity of image display modes, and a method for driving the same.

Means to Solve the Problem

A display device according to one embodiment of the present invention includes: a light source; a light guide plate having an incidence surface on which light from the light source is incident, and an emission surface from which the light from the light source, incident via the incidence surface, is emitted; a display panel stacked on the emission surface of the light guide plate, the display panel displaying an image by controlling a transmittance of light incident thereon for each of a plurality of pixels; a panel driving unit that outputs, to the display panel, a signal for controlling a transmittance of the display panel for each pixel, based on image data that indicate an image to be displayed on the display panel; and a light source driving unit that drives the light source. Light can pass through a back surface of the light guide plate, the back surface being a surface opposed to the emission surface. The light source driving unit drives the light source based on lighting control data that indicate whether or not the light source should be turned on when the image indicated by the image data is displayed. In a case where an image is displayed when the light source is in ON state, the display panel displays a color image, by controlling, pixel by pixel, a transmittance of light that passes from the light source through the emission surface of the light guide plate and is incident on the display panel, based on the signal of the panel driving unit. In a case where an image is displayed when the light source is in OFF state, the display panel displays a transmitted light image that includes a transmitting region through which back of the display device can be seen, by controlling, pixel by pixel, a transmittance of light that passes through the back surface of the light guide plate and is incident on the display panel, based on the signal of the panel driving unit.

Effect of the Invention

According to the present disclosure, a display device that is capable of realizing the diversity of image display modes, and a method for driving the same.

MODE FOR CARRYING OUT THE INVENTION

Figure 1:
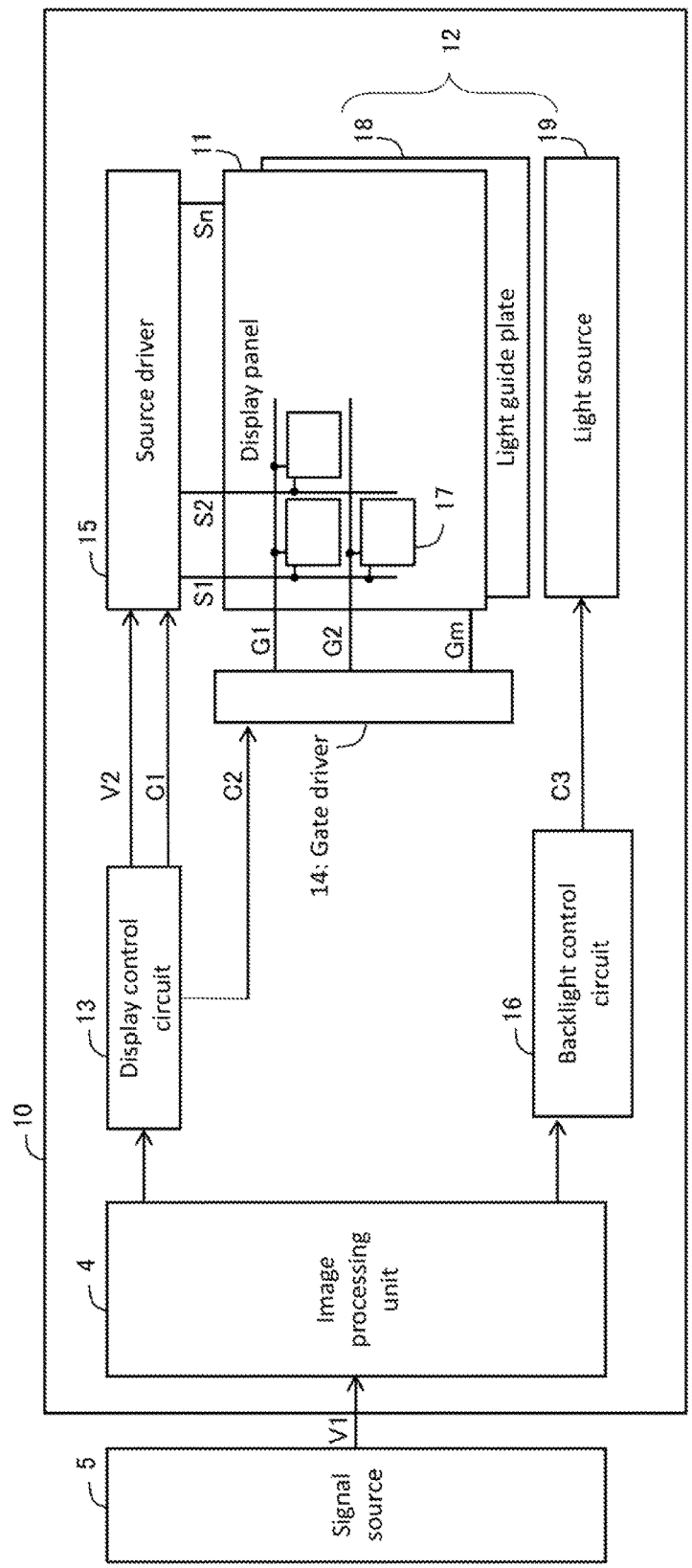
FIG. 1 is a functional block diagram that illustrates an exemplary configuration of a display device according to Embodiment 1.

A display device according to one embodiment of the present invention includes: a light source; a light guide plate having an incidence surface on which light from the light source is incident, and an emission surface from which the light from the light source, incident via the incidence surface, is emitted; a display panel stacked on the emission surface of the light guide plate, the display panel displaying an image by controlling a transmittance of light incident thereon for each of a plurality of pixels; a panel driving unit that outputs, to the display panel, a signal for controlling a transmittance of the display panel for each pixel, based on image data that indicate an image to be displayed on the display panel; and a light source driving unit that drives the light source. Light can pass through a back surface of the light guide plate, the back surface being a surface opposed to the emission surface. The light source driving unit drives the light source based on lighting control data that indicate whether or not the light source should be turned on when the image indicated by the image data is displayed. In a case where an image is displayed when the light source is in ON state, the display panel displays a color image, by controlling, pixel by pixel, a transmittance of light that passes from the light source through the emission surface of the light guide plate and is incident on the display panel, based on the signal of the panel driving unit. In a case where an image is displayed when the light source is in OFF state, the display panel displays a transmitted light image that includes a transmitting region through which back of the display device can be seen, by controlling, pixel by pixel, a transmittance of light that passes through the back surface of the light guide plate and is incident on the display panel, based on the signal of the panel driving unit.

In the above-described configuration, light can pass through the back surface of the light guide plate, which is a surface opposed to the light emission surface. The panel driving unit outputs a signal based on the image data to the display panel. The light source driving unit can control the turning-on/off of the light source, regarding whether the light source should be turned on or not when an image indicated by the image data is displayed. When the light source is in ON state, the display panel displays a color image, by controlling a transmittance of light that passes from the light source through the emission surface of the light guide plate and is incident on the display panel. Further, when the light source is in OFF state, the display panel displays a transmitted light image that includes a transmitting region through which back of the display device can be seen, by controlling a transmittance of light that passes through the back surface of the light guide plate and is incident on the display panel. This makes it possible to switch the mode between the color image display mode and the transmitted light image display mode by controlling the turning-on/off of the light source when an image is displayed. As a result, in the display device, the diversity of the image display mode can be realized.

The image data contain respective gray level values of the pixels in the image to be displayed. A gray level value of the image data for causing the pixel to display white color in the display of the color image can be set so as to correspond to a gray level value of a transmittance at which light from the back surface of the light guide plate passes through the pixel in the transmitted light image display. This causes an area corresponding to white color in the color image displayed when the light source is in ON state becomes a transmitting region in the transmitted light image displayed when the light source is in OFF state through which the back of the display device is seen. Therefore, by controlling the turning-on/off of the light source, an area in the display image corresponding to white color can be displayed in white color in some cases, and turned into a transmitting region in other cases.

The display device can further include a sub-field generation part that generates a plurality of sub-field images to be displayed during a plurality of sub-field periods, respectively, based on the image data, the sub-field periods being obtained by dividing one frame period. In this case, the light source can be configured so as to be capable of emitting lights of a plurality of colors that are different from one another. The panel driving unit outputs, to the display panel, a signal for causing the sub-field images to be sequentially displayed during the sub-field periods in one frame period, respectively. When the light source is turned on and the color image is displayed, the light source driving unit switches the color of light to be emitted, every sub-field period.

With the above-described configuration, the display panel can be driven by the field sequential method. Since this makes color filters unnecessary, the transparency of the transmitting region in the transmitted light image can be improved. Further, this makes it possible to display a color image when the light source is in ON state, and to display a monochrome image that includes a transmitting region when the light source is in OFF state.

The sub-field generation part makes a processing operation for generating the sub-field images of the image to be displayed by turning on the light source, and a processing operation for generating the sub-field images of the image to be displayed by turning off the light source, different from each other. This makes it possible to generate sub-field images suitable for the display image in both cases when the light source is in ON state and when the light source is in OFF state.

The sub-field generation part can be configured so as to generate a sub-field image corresponding to a mixed color of the plurality of colors, in addition to the sub-field images corresponding to the colors of the light source, respectively. In this case, in the processing operation for generating the sub-field images of the image to be displayed by turning on the light source, the sub-field generation part can execute a processing operation for changing gray level values of sub-field images corresponding to the respective colors according to a gray level value of a sub-field image of the mixed color. Further, the configuration can be such that, in the processing operation for generating the sub-field images of the image to be displayed by turning off the light source, the sub-field generation part does not execute the processing operation for changing the gray level values of the sub-field images corresponding to the respective colors according to the gray level value of the sub-field image of the mixed color.

With the above-described configuration, in the color image display when the light source is in ON state, a sub-field image corresponding to the mixed color is generated, and gray level values of the sub-field images corresponding to the respective colors are changed, whereby color breakup can be suppressed. In the transmitted light image display when the light source is in OFF state, which includes a transmitting region, the gray level values of the sub-field images corresponding to the respective colors are not changed, whereby the degree of transparency of the transmitting region can be improved.

The display panel can display the transmitted light image including the transmitting region and a black region exclusively, in a case of image display when the light source is in OFF state. This allows the difference between the color image display mode and the transmitted light image display mode to increase. This makes it possible to, for example, realize a display mode that provides eye-catching display in the display device.

The light source driving unit can switch the turning-on and the turning-off of the light source, while the panel driving unit is causing the display panel to display an image based on the same image data. This makes it possible to switch the display between the color display and the transmitted light image display, while contents of the same image data are displayed. Therefore, with the same contents, display modes of two types are enabled. For example, a display mode that provides eye-catching display can be realized.

A method for driving a display device according to one embodiment of the present invention is a method for driving a display device that includes a light source; a light guide plate having an incidence surface on which light from the light source is incident, and an emission surface from which the light from the light source, incident via the incidence surface, is emitted; and a display panel stacked on the emission surface of the light guide plate, the display panel displaying an image by controlling a transmittance of light incident thereon for each of a plurality of pixels. Light can pass through a back surface of the light guide plate, the back surface being a surface opposed to the emission surface. The method includes the steps of: outputting, to the display panel, a signal for controlling a transmittance of the display panel for each pixel, based on image data that indicate an image to be displayed on the display panel; and driving the light source based on lighting control data that indicate whether or not the light source should be turned on, corresponding to display of the image indicated by the image data. In a case where an image is displayed when the light source is in ON state, a color image is displayed, by controlling, pixel by pixel, a transmittance of light that passes from the light source through the emission surface of the light guide plate and is incident on the display panel according to the signal, and in a case where an image is displayed when the light source is in OFF state, a transmitted light image that includes a transmitting region through which back of the display device can be seen is displayed, by controlling, pixel by pixel, a transmittance of light that passes through the back surface of the light guide plate and is incident on the display panel according to the signal.

The following describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of part of constituent members is omitted. Further, the dimension ratios of the constituent members illustrated in the drawings do not necessarily indicate the real dimension ratios.

Embodiment 1

(Exemplary Configuration of Display Device)

FIG. 1 is a functional block diagram illustrating an exemplary configuration of a display device according to Embodiment 1. A display device 10 illustrated in FIG. 1 displays an image based on image data supplied from a signal source 5 provided outside. The display device 10 includes a display panel 11, and a backlight 12 that includes a light source 19 and a light guide plate 18. The light guide plate 18 guides light of the light source 19 to the display surface of the display panel 11. The display panel 11 is provided so as to be stacked on the light guide plate 18. The display panel 11 displays an image by controlling the transmittance of light incident on the display panel 11 for each of a plurality of pixels. In the description of the present embodiment, a case where the display device 10 is a liquid crystal display device that control the light transmittance per pixel by controlling the alignment of liquid crystal is described as one example.

As control circuits that control the display panel 11 and the backlight 12, the display device 10 includes an image processing unit 4 that processes image data so as to output data for driving the display panel 11 and the backlight 12, a display control circuit 13, a gate driver 14, a source driver 15, and a backlight control circuit 16.

The display panel 11 includes m gate lines G1 to Gm, n source lines S1 to Sn, and (m×n) pixel circuits 17. The gate lines G1 to Gm are formed so as to extend in a first direction (in the example illustrated in FIG. 1, the horizontal direction (lateral direction) of the display screen). The source lines S1 to Sn are formed so as to extend in a direction that intersects with the first direction (in the example illustrated in FIG. 1, the vertical direction (longitudinal direction) of the display screen). The (m×n) pixel circuits 17 are provided so as to correspond to intersection points at which the gate lines G1 to Gm and the source lines S1 to Sn intersect, respectively. The gate lines can be also referred to as scanning lines, and the source lines can be also referred as data lines or signal lines. Further, the gate driver can be also referred to as a scanning line driving circuit, and the source driver can be also referred to as a data line driving circuit.

The signal source 5 supplies, to the display device 10, image data V1 that indicate an image to be displayed every frame period. The image data V1 supplied to the display device 10 are input to the image processing unit 4. The image processing unit 4 processes the input image data V1 and outputs the same to the display control circuit 13, and at the same time, controls the timings of the image display and the turning on of the light source 19 in the backlight 12.

More specifically, the display control circuit 13 controls the source driver 15 and the gate driver 14 based on the image data, and causes the display panel 11 to output, to the display panel 11, a signal for controlling the transmittance of each pixel. The display control circuit 13 outputs a control signal C1 and image data V2 to the source driver 15. The control signal C1 contains, for example, a source start pulse and a source clock. The source driver 15 drives the source lines S1 to Sn based on the control signal C1 and the image data V2. The display control circuit 13 outputs the control signal C2 to the gate driver 14. The gate driver 14 drives the gate lines G1 to Gm based on the control signal C2. The control signal C2 contains, for example, a gate start pulse and a gate clock.

The gate driver 14 sequentially selects the gate lines G1 to Gm one by one at timings in accordance with the control signal C2. To the selected gate line, a selection voltage is applied over one line period. The source driver 15 applies source voltages according to the image data V2 to the source lines S1 to Sn over one line period at timings in accordance with the control signal C1. With this operation, source voltages according to the image data V2 are written in the n pixel circuits 17 connected to the selected gate line, respectively. This operation is repeated sequentially with respect to the gate lines G1 to Gm. As a result, a source voltage according to the image data V2 in each pixel circuit 17 is written, whereby the transmittance of each pixel is controlled. The display panel 11 displays an image indicated by the image data V2.

In this way, the display control circuit 13, the gate driver 14, and the source driver 15 are configured as a panel driving unit that outputs, to the display panel 11, a signal for controlling the transmittance of each pixel of the display panel 11, based on image data V1, V2 that indicate an image to be displayed on the display panel 11.

Further, the image processing unit 4 outputs backlight data C3 that indicate whether or not the light source 19 is to be turned on, to the backlight control circuit 16. The backlight control circuit 16 controls the turning-on/off of the light source based on the backlight data C3. For example, the backlight 12 is turned on when the backlight data C3 are "1", and is turned off when the backlight data C3 are "0". The backlight control circuit 16 is an exemplary light source driving unit that drives the light source 19.

In the following description of the present embodiment, a case where the display device 10 displays color images by the field sequential method is described, as one example. In the field sequential method, a color image is displayed by displaying different color screens at a plurality of sub-fields, respectively, the sub-fields being obtained by dividing one screen display period, that is, one frame period. During color image display, the backlight control circuit 16 switches the color of light emitted by the light source 19, in synchronization with the timings at which the sub-field images of different colors are displayed on the display panel 11 by the display control circuit 13.

Alternatively, according to the backlight data C3 output from the backlight control unit 16, for example, the state of the backlight 12 (for example, the ON state or the OFF state) can be controlled for every frame period. For example, the configuration may be as follows: lighting control data that indicate whether the backlight 12 is to be turned on or not when an image displayed based on the input image data V1 is displayed are received from the signal source 5, and based on the lighting control data, whether the backlight 12 is to be turned on or not is controlled during one frame period while one image is displayed. This allows the display device 10 to operate in a color image display mode in which a color image is displayed, and in a transmitted light image display mode in which a monotone image that has a transmitting region in which the back of display device 10 can be seen therethrough is displayed, as will be described later.

Figure 2:
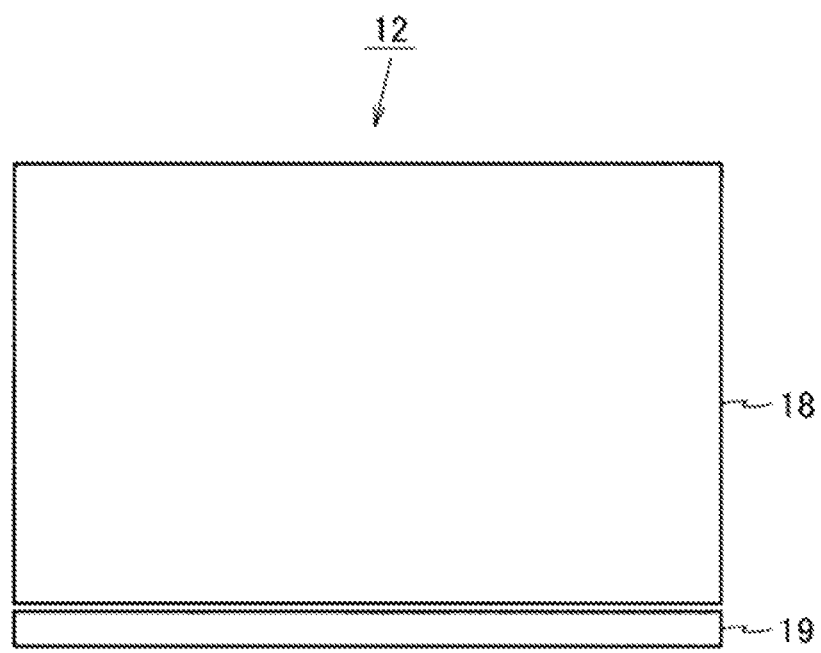
FIG. 2 illustrates an exemplary configuration of a backlight when it is viewed in a direction vertical to a display surface.

The backlight 12 projects light to the back surface of the display panel 11. FIG. 2 illustrates an exemplary configuration of the backlight 12 when it is viewed in a direction vertical to the display surface. In the example illustrated in FIG. 2, the backlight 12 is an edge light type backlight. In other words, the light source 19 is arranged so as to be opposed to the side surface of the light guide plate 18 (the lower side surface in the example illustrated in FIG. 2). In the light source 19, there are provided, for example, light-emitting diodes (LEDs) of three colors of R, G, B and the like. The light guide plate 18 is made of a transparent material. In the backlight 12, a portion thereof that overlaps the display screen of the display panel 11, that is, the display area where the pixels are arranged, is transparent. In FIG. 2, the light source 19 is arranged at a position opposed to one side surface of the light guide plate 18, but the light source 19 may be arranged at a position opposed to a plurality of side surfaces of the light guide plate 18.

Figure 3A:
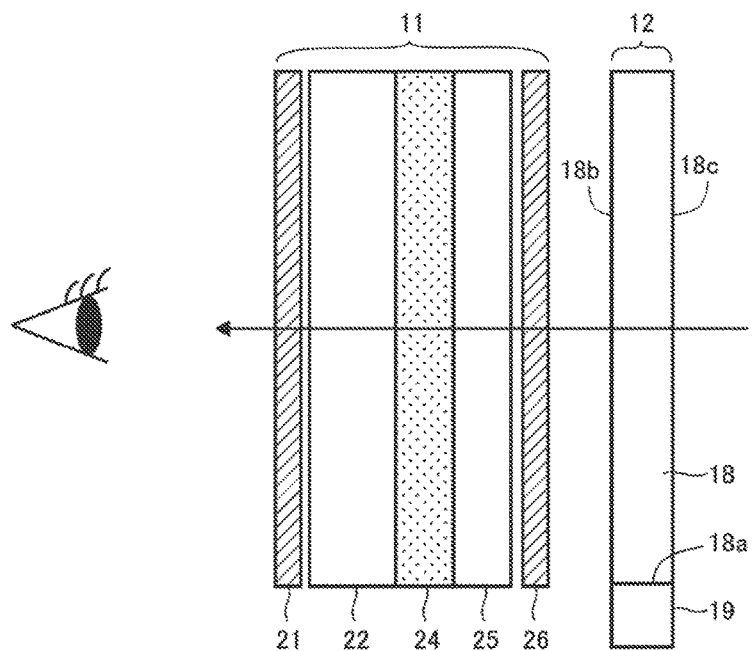
FIG. 3A is a cross-sectional view taken along a plane vertical the display surface of the display device.
Figure 3B:
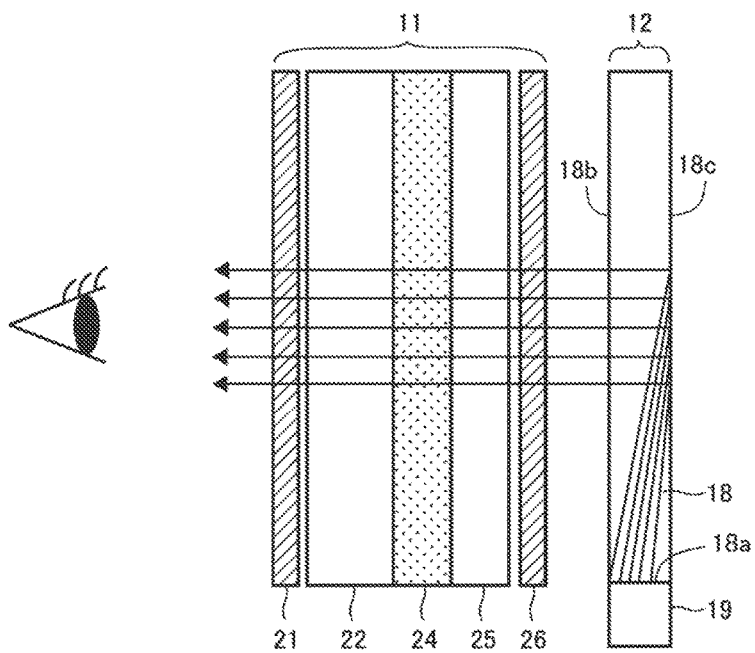
FIG. 3B is a cross-sectional view taken along a plane vertical the display surface of the display device.

FIGS. 3A and 3B are cross-sectional views taken along a plane vertical the display surface of the display device. FIG. 3A illustrates an exemplary state in which the backlight 12 is turned off and a transmitted light image that includes a transmitting region where the back of the display device 10 can be seen therethrough is displayed. FIG. 3B illustrates an exemplary state in which the backlight 12 is turned on and a color image is displayed.

In the example illustrated in FIGS. 3A and 3B, the display panel 11 is provided at a position where the display panel 11 overlaps the backlight 12 when viewed in a direction vertical to the display screen. The display panel 11 includes two substrates, i.e., a first substrate 25 and a second substrate 22, as well as liquid crystal 24 provided therebetween. One of surface of the first substrate 25 (for example, the surface thereof on a side opposite to the backlight 12), the gate lines G1 to Gm, the source lines S1 to Sn, the pixel circuits 17, and the like are provided. On the other surface of the first substrate 25, a polarizing plate 26 is provided. On one of surface (for example, the backlight 12 side surface) of the second substrate 22, a common electrode (not shown) is formed. On the other surface of the second substrate 22, a polarizing plate 21 is provided. The first substrate 25 and the second substrate 22 can be made of, for example, glass or resin.

The light guide plate 18 of the backlight 12 has an incidence surface 18a on which light from the light source 19 is incident, and an emission surface 18b from which the light of the light source 19 incident via the incidence surface 18a is emitted. The display panel 11 is provided so as to overlap the emission surface 18b of the light guide plate 18. In other words, the backlight 12 is an illumination unit that projects light on one of surfaces of the display panel 11.

As illustrated in FIG. 3A, the back surface 18c, which is a surface opposed to the emission surface 18b of the light guide plate 18, a display area on which an image of the display panel 11 is displayed, that is, an area that overlaps the display screen, allows light to pass therethrough. The backlight 12 has such a configuration that a portion thereof that overlaps the display screen of the display panel 11 allows light to pass therethrough. For example, in the backlight 12, members provided at positions overlapping the display area of the display panel 11 when viewed in a direction vertical to the display screen are made of transparent materials.

More specifically, on the back surface of the display panel 11, a light guide plate 18 is arranged that allows light to pass therethrough in the direction vertical to the display screen. In other words, on the back surface of the display panel 11, members that block light are not arranged. The configuration may be such that transparent materials such as an acrylic plate are used for forming members on the back side of the light guide plate 18, or alternatively, no member is arranged on the back surface of the light guide plate 18. With this configuration, at a pixel in which the liquid crystal 24 is controlled so that light is transmitted on the display panel 11, light that has been transmitted from the back of the display device 10, through the back surface of the light guide plate 18, passes through the pixel on the display panel 11, thereby being transmitted toward the front side of the display screen.

Further, as illustrated in FIG. 3B, the light guide plate 18 has such a configuration that light from the light source 19 that propagates through the light guide plate 18 tends to go out through the emission surface 18b opposed to the display panel 11, toward the display panel 11. Dots (not shown) that reflect incident light, for example, can be formed at predetermined intervals on the emission surface 18b and the back surface 18c of the light guide plate 18. Light from the light source 19 that is incident via the incidence surface 18a of the light guide plate 18 advances in the light guide plate 18, while being totally reflected therein. Light from the light source 19 incident onto the dots on the back surface 18c of the light guide plate 18 are reflected by the dots, and goes out from the emission surface 18b of the light guide plate 18 toward the display panel 11.

The dots are formed by, for example, printing a non-transparent white ink (an organic-type ultraviolet light curable ink or the like), a metal ink (aluminum, gold, etc.), or the like. Alternatively, in place of the dots formed by printing, the surface of the light guide plate 18 may be formed into a shape on which light tends to be reflected, by die pressing, or laser processing. Further alternatively, the configuration is not limited to a configuration in which the reflection due to the shape of the surface of the light guide plate 18 is utilized, but the light guide plate 18 may be formed with a material that easily reflects light. In this way, the light guide plate 18 can include a reflection structure that reflects light advancing the internal, and allows the same to go outside.

In this way, when the backlight 12 is in ON state, the amount of light emitted from the light source 19 through the light guide plate 18 and projected to the display panel 11 is greater as compared with the amount of light that passes through the back surface 18b of the light guide plate 18 and reaches the display panel 11. When the backlight 12 is in ON state, therefore, the color of light of the backlight 12 is displayed on the display panel 11, and the back of the display device 10 is by no means seen therethrough.

In the present embodiment, the display device 10 has the color display mode and the transmitted light image display mode. In the color display mode, the backlight 12 is turned on, and the display panel 11 displays a color image that does not include a transmitting region in which the back of the display device 10 can be seen therethrough. In the transmitted light image display mode, the backlight 12 is turned off, and the display panel 11 displays a monotone image (transmitted light image) that includes a transmitting region.

The display panel 11 displays an image, in both of the color display mode and the transmitted light image display mode, by controlling the transmittance of light incident on the display panel 11, pixel by pixel, based on the signal of the panel driving unit. In the case of the color display mode, that is, in the case where the backlight 12 is turned on when an image is displayed, the display panel 11 is supposed to control the transmittance of light that propagates from the light source 19 through the inside of the light guide plate 18, passes through the emission surface 18b, and becomes incident onto the display panel 11. Further, in the case of the transmitted light image display mode, that is, in the case where the backlight 12 is turned off when an image is displayed, the display panel 11 is supposed to control the transmittance of light that comes from outside the display device 10, is transmitted through the back surface 18c of the light guide plate 18, and is incident on the display panel 11. With this configuration, a transmitted light image that includes a transmitting region can be displayed. In the transmitting region, the back of the display device 10 can be seen therethrough.

Figure 4:
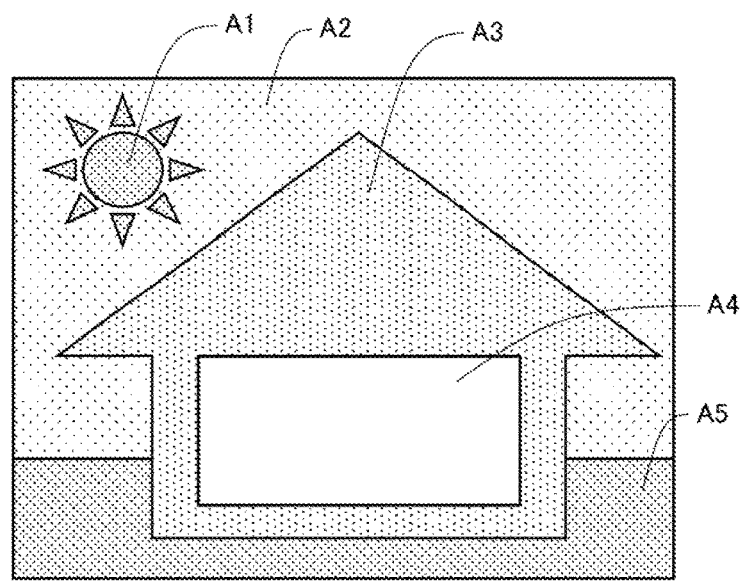
FIG. 4 illustrates an exemplary display image in a color display mode.
Figure 5:
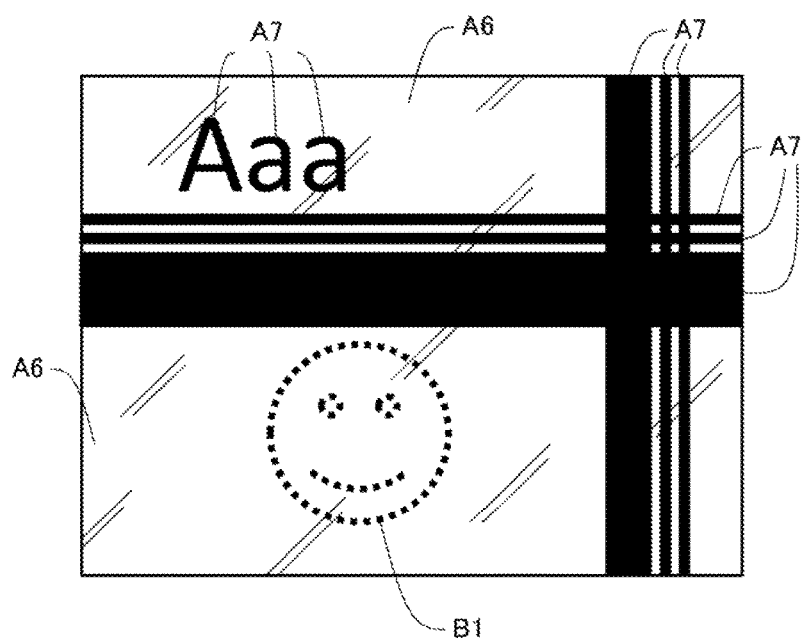
FIG. 5 illustrates an exemplary transmitted light image display mode.

FIG. 4 illustrates an exemplary display image in the color display mode. FIG. 5 illustrates an example of the transmitted light image display mode. In the example illustrated in FIG. 4, the area A1 is displayed in red color, the area A2 is displayed in blue color, the area A3 is displayed in yellow color, the area A4 is displayed in white color, and the area A5 is displayed in green color. The display image illustrated in FIG. 5 includes a transmitting region A6 and an area A7 displayed in black. In the transmitting region A6, an object B1 behind the display device 10 is seen therethrough.

For example, in the color display mode, lights of R, G, and B emitted from the backlight 12 display colors according to the transmittances adjusted by the display panel 11, respectively. In the transmitted light image display mode, the backlight 12 is turned off. In an area of a pixel having a sufficiently great transmittance, therefore, as is the case with the area A6 in the image illustrated in FIG. 5, light that has passed through the back surface of the light guide plate 18 goes out to the front side of the display screen. Such an area therefore becomes a transmitting region, in which the background of the display device 10 can be seen therethrough. This is made possible by, for example, arranging the light guide plate 18, through which light from the outside of the display device 10 can pass from the back surface, on the back surface of the display panel 11. Incidentally, the transmitting region is not limited to a pixel area having the highest transmittance. For example, a pixel area whose transmittance is controlled to such a level that the back of the display device can be seen therethrough can be included in the transmitting region.

In an area of pixels in which transmittances for all of the colors of R, G, and B are sufficiently great in the color display mode (for example, a pixel having the maximum transmittance), for example, white color is displayed by light of the backlight 12, as is the case with the area A4 of the image illustrated in FIG. 4. In contrast, in the transmitted light image display mode, pixels having a sufficiently great transmittance compose a transmitting region having high transparency. In the display device 10, therefore, for example, an area having a gray level value indicating "white" in the image data V1 input from the signal source 5 is in a state of white color display when the backlight is in ON state, and is in a state of transparent display when the backlight is in OFF state. The transparent display is a state in which the back surface of the display device 10 becomes transparent, allowing visual observation. This makes it possible to make, for example, the following presentation possible: the display becomes color display when the backlight is in ON state, and the display becomes monotone display that includes an area of transparent display and an area of black (or gray scales), when the backlight in OFF state. In this way, display modes that can be performed in the display device 10 are diversified, which widens the range of presentation by images.

(Exemplary Detailed Configuration of Image Processing Unit)

Figure 6:
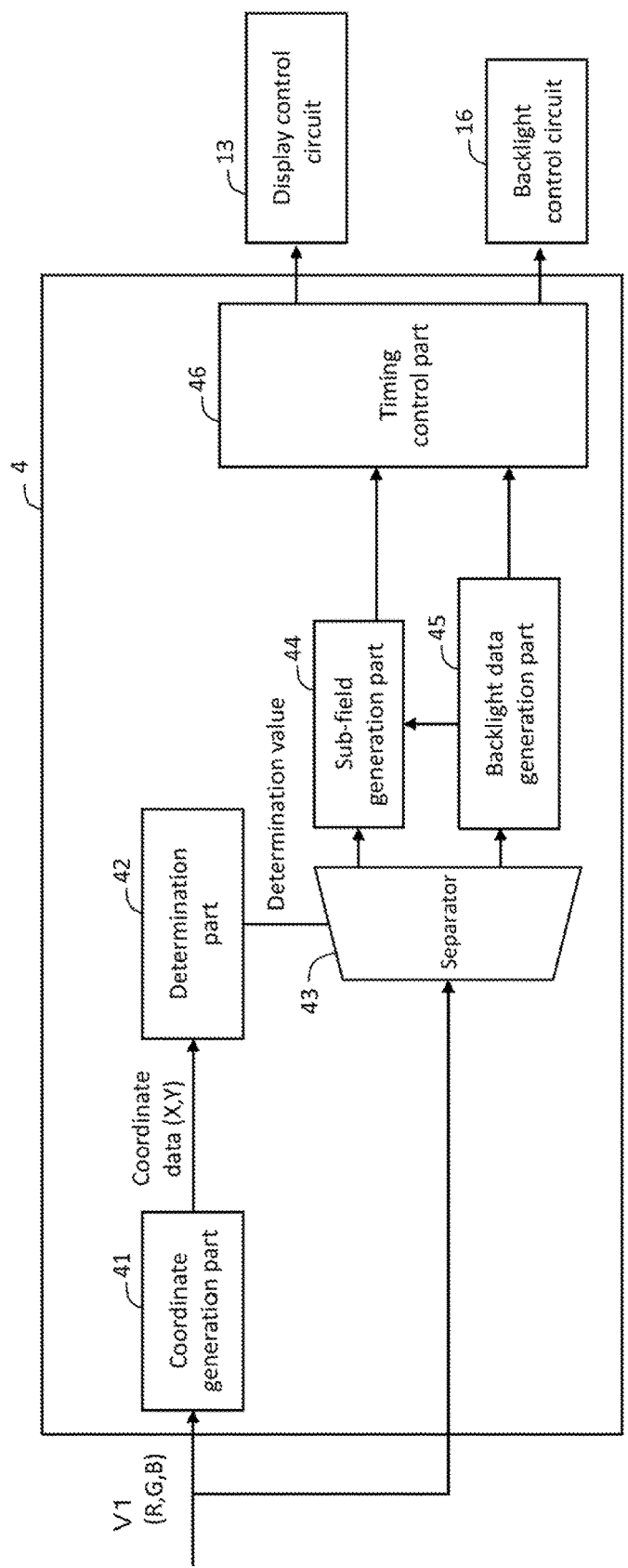
FIG. 6 is a functional block diagram illustrating an exemplary detailed configuration of an image processing unit of the display device illustrated in FIG. 1.

FIG. 6 is a functional block diagram illustrating an exemplary detailed configuration of the image processing unit 4 of the display device 10 illustrated in FIG. 1. The example illustrated in FIG. 6 is an exemplary configuration in a case where the display device 10 is a field sequential display device. In this example, the image processing unit 4 includes a coordinate generation part 41, a determination part 42, a separator 43, a sub-field generation part 44, a backlight data generation part 45, and a timing control part 46.

The coordinate generation part 41, the determination part 42, and the separator 43 are circuits that detect control information of the backlight 12 contained in the image data V1 input thereto. Here, a case where information for controlling the turning on or off of the backlight 12 is detected every frame period is described. The image data V1 contain, for example, respective data of a plurality of pixels (gray level values of R, G, and B of each pixel, for example). The coordinate generation part 41 generates data that indicate coordinates (X, Y) of each pixel in the image data input thereto.

The coordinate generation part 41 includes, for example, a memory (register) that can be rewritten from the outside for holding the number M of pixels in the horizontal direction, and the number N of lines in the vertical direction. The coordinate generation part 41 increments a horizontal counter (variable) by 1 whenever pixel data are input. When the horizontal counter becomes equal to M, at the next input of pixel data, a perpendicular line counter (variable) is incremented by 1, and the horizontal counter is returned to 1. The coordinate generation part 41, upon every input of pixel data, stores the values of the horizontal counter and the perpendicular counter, as coordinate values (X, Y). In this way, coordinates (X, Y) of each pixel of image data V1 input thereto can be generated. Incidentally, in this example, an upper left pixel in an image indicated by image data V1 is assumed to be the origin, the X direction is assumed to be the horizontal direction, and the Y direction is assumed to be the vertical direction.

The determination part 42 identifies data to be used as control information of the backlight 12, in the data of a plurality of pixels contained in the image data. For example, pixel values of preliminarily determined particular coordinates (data of coordinates (0, 0), as one example) in the image data can be identified as values indicating control information of the backlight 12, that is, the control data for the backlight 12. The control data for the backlight 12 are data indicating the ON state/the OFF state (the non-lighting state) of the backlight 12. The determination part 42 can notify, for example, a value indicating whether the values of the coordinates are gray level values of an image displayed, or the control data for the backlight 12, as a determination value, to the separator 43.

Image data, in some cases, have a part corresponding to a video image display period of the image data, and a part corresponding to a blanking period thereof. In this case, the control data for the backlight 12 can be contained in the part corresponding to the blanking period. One frame period can be divided into an image display period and a blanking period. In accordance with this, image data V1 of one frame period includes a part corresponding to the image display period and a part corresponding to the blanking period. The part corresponding to the image display period includes data (for example, gray level values) of each pixel, corresponding to each pixel circuit 17. The part corresponding to the blanking period contains control data for the backlight 12 indicating whether the backlight 12 is to be turn on or not during this frame period.

The separator 43 separates the image data V1 into data indicating an image to be displayed, and control data for the backlight 12, according to the determination by the determination part 42. The separator 43 outputs the data indicating an image, contained in the image data V1, to the sub-field generation part 44, and outputs the control data for the backlight 12 contained in the image data V1, to the backlight data generation part 45.

The sub-field generation part 44 generates a plurality of sub-field images to be displayed during a plurality of sub-field periods, respectively, which are obtained by dividing one frame period, based on the input image data. For example, from image data containing respective gray level values of the colors of R, G, and B of each pixel, sub-field images are generated as display data for performing the field sequential display, the sub-field images corresponding to colors of W, R, G, and B, respectively, which are the colors of R, G, and B, plus the mixed color W (white color). The generated sub-field images are output to the timing control part 46.

Further, the backlight data generation part 45 generates control data for causing the light sources 19 of the corresponding colors to emit light, and outputs the same to the timing control part 46 during the sub-field periods corresponding to the colors of W, R, G, and B, respectively. For example, the backlight data generation part 45 and the timing control part 46 cause the light sources of the colors of R, G, and B to simultaneously emit light during a sub-field period corresponding to W (white color), causes the light source of R to emit light during a sub-field period corresponding to R, causes the light source of G to emit light during a sub-field period corresponding to G, and causes the light source of B to emit light during a sub-field period corresponding to B.

Further, the backlight data generation part 45 generates backlight data that indicate whether the backlight 12 should be turned on or not regarding each frame, based on control data that indicate whether or not the backlight 12 should be turned on when the image indicated by the image data V1 is displayed. For example, backlight data can be generated in the following manner: in a case where gray level values (R, G, B) of the colors of R, G, and B at the coordinates (0, 0) contained in the image data are greater than threshold values, the backlight 12 is turned on during the frame period while the foregoing image data are displayed; and in a case where the gray level values (R, G, B) are smaller than the threshold values, the backlight 12 is turned off during the frame period. In a case where the maximum value of the gray level indicated by the image data is a gray level of 255, the threshold value can be set to 128, for example. In this case, when the gray level values are (0, 0, 0), backlight data instructing the turning off of the backlight can be generated, and when the gray level values are (255, 255, 255), backlight data instructing the turning on of the backlight can be generated. The generated backlight data are input to the timing control part 46.

Incidentally, the operation for detecting the control data for the backlight 12 is not limited to the above-described example. In the above-described example, the control data for the backlight 12 are contained in the input image data V1, but the control data for the backlight 12 may be input separately, in addition to the image data V1. For example, the control data for the backlight 12 can be input at the same time of the image data V1, or in a state of being mapped to the image data V1. In this case, the image processing unit 4 is capable of inputting the control data to the backlight data generation part 45 or the timing control part 46, in synchronization with the image data V1 of one frame period, or in a state of being mapped to the image data V1 of one frame period.

The timing control part 46 performs the display of respective sub-field images of the colors of W, R, G, and B, and the timing control for synchronizing the turning on of the backlights of the colors of W, R, G, and B. In the display device 10 of the field sequential type, the backlight 12 includes the light sources 19 that emit lights of a plurality of colors, that is, lights of the colors of R, G, and B. The timing control part 46 outputs, to the display control circuit 13 and backlight control circuit 16, a timing control signal for synchronizing the timings for projecting the respective colors of R, G, and B and the color W of mixture of these, and the timings for displaying the respective sub-field images of the colors of R, G, B, and W.

Figure 7:
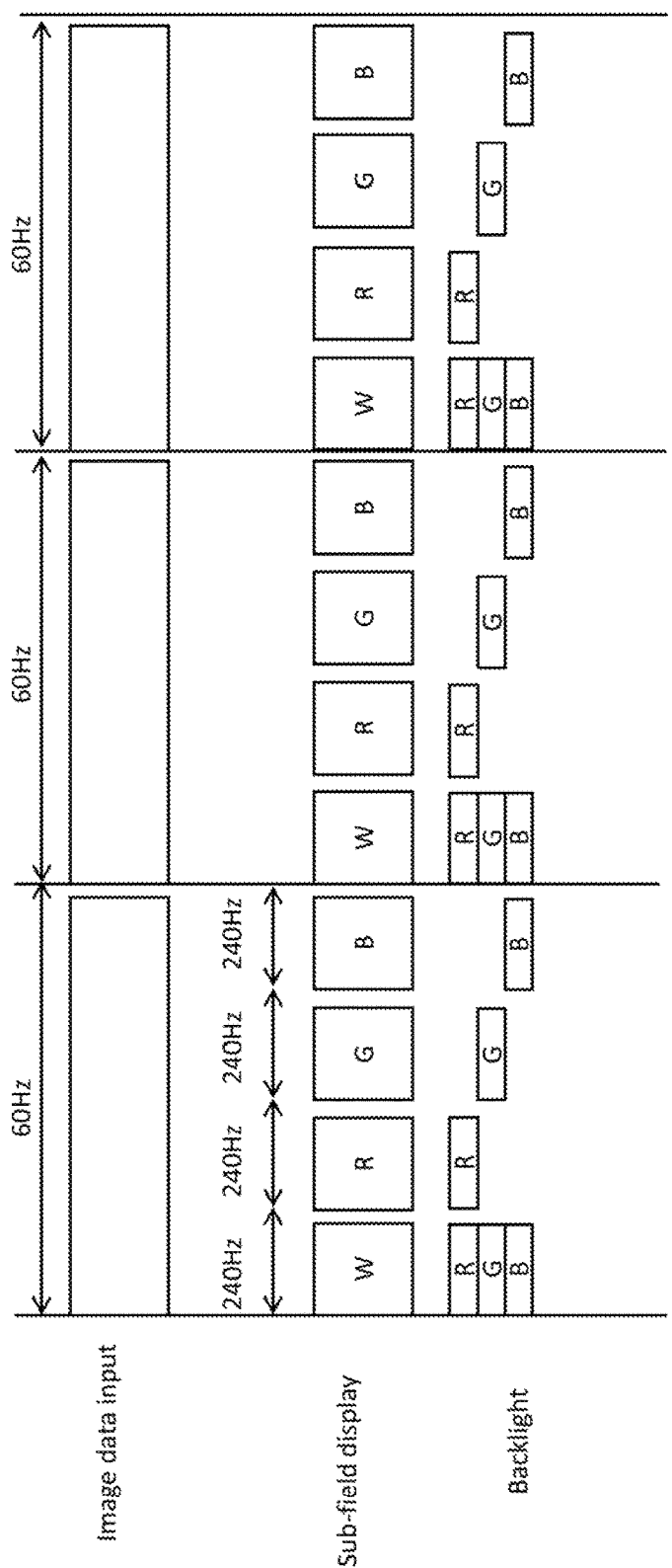
FIG. 7 is an exemplary operation in a display device that performs the field sequential display.

FIG. 7 illustrates exemplary timings of image data input, sub-field image display, and the turning on of the backlight 12, in the display device 10 performing field sequential display in the color display mode. In the example illustrated in FIG. 7, image data are input from the signal sources 5 to the display device 10 at 60 Hz during each one of the frame periods.

One frame period is divided into first to fourth sub-field periods. During the first to fourth sub-field periods, sub-field images corresponding to the colors of W, R, G, and B, respectively, are displayed. In the first to fourth sub-field period, the display is performed at 240 Hz, that is, at a frequency of four times the frequency for the image data.

During the first sub-field period, the display control circuit 13 causes the gate driver 14 and the source driver 15 to output a signal based on data of a sub-field image of the mixed color W to the display panel 11, and the backlight control circuit 16 causes the backlight 12 to cause the light sources of the colors of R, G, and B to emit light simultaneously. This causes the mixed color W, i.e., light of the white color, to be emitted from the light sources 19. In this way, a field of W (white) is displayed during the first sub-field period. During the second sub-field period, the light source of R (red) emits light, whereby a field of R (red) is displayed. During the third sub-field period, the light source of G (green) emits light, whereby a field of G (green) is displayed. During the fourth sub-field period, the light source of B (blue) emits light, whereby a field of B (blue) is displayed.

The above-described field sequential display is performed in the color display mode. In the transmitted light image display mode, the backlight 12 remains in OFF state, and sub-field images corresponding to the colors of W, R, G, and B, respectively, are sequentially displayed during one frame period. Thus, in the transmitted light image display mode, at each pixel, an image is displayed at a transmittance corresponding to any gray level between a gray level of the highest transmittance (complete transparency) and a gray level of the lowest transmittance (black). In the transmitted light image display mode, therefore, a monochrome image (complete transparency-black image) including a transmitting region is displayed. The display device 10 is capable of displaying, for example, an image in a gray scale between complete transparency and black in the transmitted light image display mode. Alternatively, the display device 10 is also capable of displaying a binary image that includes pixels of only complete transparency and black.

In the transmitted light image display mode, in which the backlight is in OFF state, the image data V1 to be input may be, for example, a binary image, whereby a binary image can be displayed. Or alternatively, the image data V1 thus input may be converted into a binary image by the image processing unit 4, whereby a binary image can be displayed. In the latter case, the image processing unit 4 has such a configuration that the image data processing operation in the case of the color display mode and that in the case of the transmitted light image display mode are different. For example, the image processing unit 4 may have a configuration including a color image generation part that generates image data for displaying a color image based on the image data V1, a binary image generation part that generates a binary image of transparency and black based on the image data V1, and a switching part for switching the image data output by the color image generation part and the image data output by the binary image generation part, based on data for controlling the turning on of the backlight.

(Exemplary Detailed Configuration of Sub-Field Generation Part)

Figure 8:
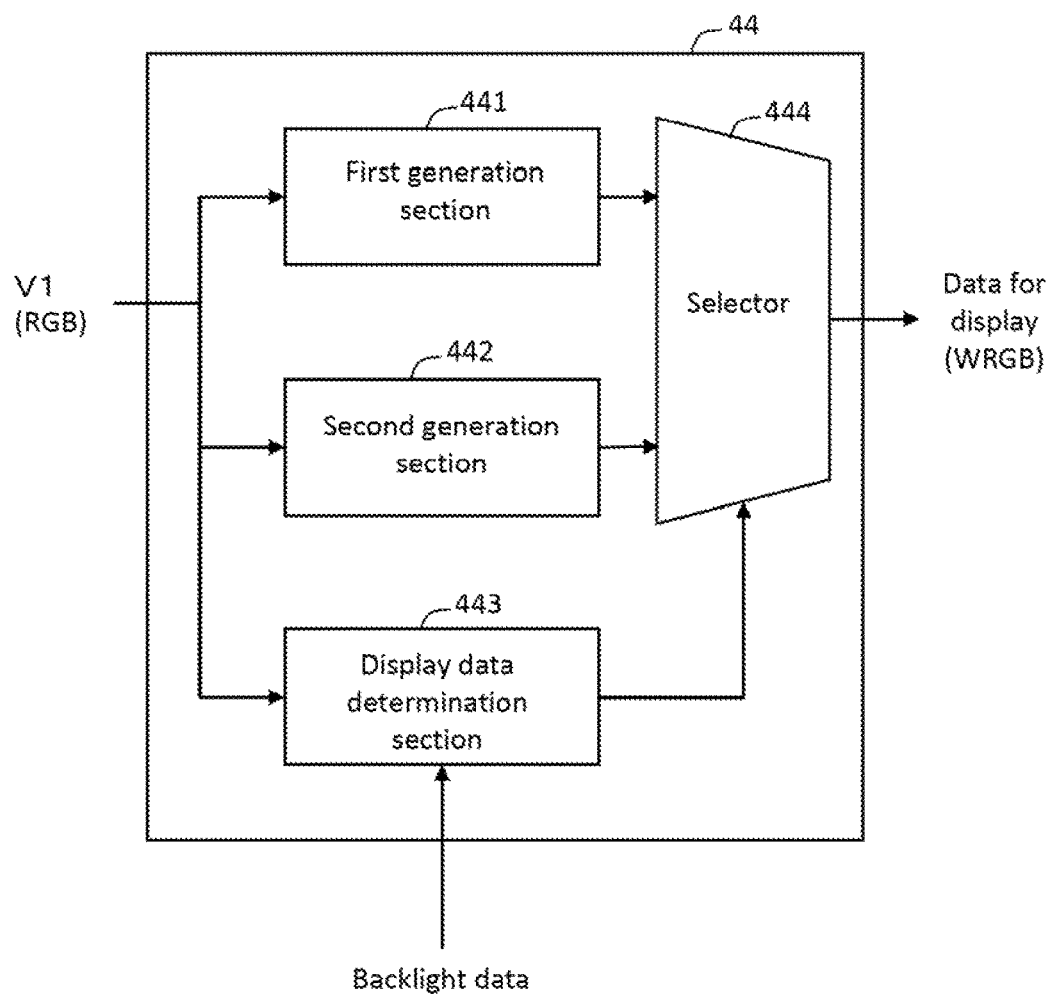
FIG. 8 is a functional block diagram illustrating an exemplary detailed configuration of the sub-field generation part 44 illustrated in FIG. 6.

The above-described sub-field generation part 44 is capable of making the sub-field image generation processing in the color display mode, and the sub-field image generation processing in the transmitted light image display mode, different from each other. FIG. 8 is a functional block diagram illustrating an exemplary detailed configuration of the sub-field generation part 44 illustrated in FIG. 6.

In the example illustrated in FIG. 8, the sub-field generation part 44 includes a first generation section 441 that generates sub-field images of an image to be displayed in the color display mode with the light sources 19 being in ON state, and a second generation section 442 that generates sub-field images of an image to be displayed in the transmitted light image display mode with the light sources 19 being in OFF state. Further, the sub-field generation part 44 includes: a display data determination section 443 that determines, based on the backlight data, which sub-field images should be output as display data, those of the first generation section 441, or those of the second generation section 442; and a selector 444 that selects sub-field images to be output as display data, based on the determination by the display data determination section 443.

The first generation section 441 generates a sub-field image corresponding to the mixed color W (white color) obtained by mixing the colors of R, G, and B, based on respective gray level values of the colors of R, G, and B of the image data V1 input thereto. Further, the first generation section 441 generate sub-field images corresponding to the respective colors of R, G, and B, based on the respective gray level values of the colors of R, G, and B of the image data V1 input thereto. Here, the first generation section 441 can assume gray level values obtained by changing the respective gray level values of the colors of R, G, and B of the image data V1 according to the gray level value of the sub-field image of the mixed color W, as the respective gray level values of the sub-field images of the colors of R, G, and B.

The second generation section 442 generates a sub-field image corresponding to the mixed color W (white color) obtained by mixing the colors of R, G, and B, based on respective gray level values of the colors of R, G, and B of the image data V1 input thereto. Further, the second generation section 442 generates sub-field images corresponding to the colors of R, G, and B, based on the respective gray level values of the colors of R, G, and B of the image data V1 input thereto. Here, the second generation section 442 can assume the respective gray level values of the colors of R, G, and B of the image data V1, as the respective gray levels of the sub-field images that respectively correspond to the foregoing colors. In other words, the second generation section 442 can have such a configuration that changes according to the gray level value of the sub-field image of the mixed color W are not added to the respective gray level values of the colors of R, G, and B of the image data V1.

In a specific example, the first generation section 441 can determine, as described below, gray level values (Wout, Rout, Gout, Bout) corresponding to the colors of W, R, G, and B of the display data, with respect to gray level values (Rin, Gin, Bin) of the colors of R, G, and B of the input image data V1. In the following description, "min(Rin, Gin, Bin)" represents a gray level value indicating the lowest transmittance among the gray level values (Rin, Gin, Bin) of the colors of R, G, and B.

Wout=min(Rin,Gin,Bin)

Rout=Rin−Wout

Gout=Gin−Wout

Bout=Bin−Wout

More specifically, the first generation section 441 compares gray level values (Rin, Gin, Bin) of each pixel in the input image data V1, determines the lowest gray level value min(Rin, Gin, Bin) in each pixel, and assumes this as the gray level value Wout of the mixed color W. Here, however, a gray level value further lower than the min(Rin, Gin, Bin) may be assumed to be the gray level value Wout of the mixed color W. The first generation section 441 calculates values obtained by subtracting the gray level value Wout of the mixed color W from the gray level values (Rin, Gin, Bin) of the colors of R, G, and B of each pixel in the image data V1, and assumes the same as the respective gray level values of the sub-fields of the colors of R, G, and B.

The second generation section 442 can determine gray level values (Wout, Rout, Gout, Bout) corresponding to the colors of W, R, G, and B of the display data as described above, with respect to the gray level values (Rin, Gin, Bin) of the colors of R, G, and B of the input image data V1.

Wout=min (Rin, Gin, Bin)

Rout=Rin

Gout=Gin

Bout=Bin

More specifically, the second generation section 442 assumes the lowest gray level value min(Rin, Gin, Bin) among the gray level values (Rin, Gin, Bin) of each pixel in the input image data V1 as the gray level value Wout of the mixed color W. Here, the second generation section 442 assumes the respective gray level values (Rin, Gin, Bin) of the colors of R, G, and B in the input image data V1 as the gray level values (Wout, Rout, Gout, Bout) of the sub-field images corresponding to the colors, respectively. In other words, a processing operation of changing the gray level values (Rin, Gin, Bin) of the colors of R, G, and B according to the gray level value Wout of the mixed color W is not executed.

The display data determination section 443 determines which sub-field image is to be output as the display data, the sub-field image of the first generation section 441 or the sub-field image of the second generation section 442, based on the backlight data generated by the image data V1 and the backlight data generation part 45. In one example, it can be determined that, in an image displayed while the backlight is in OFF state, the gray level values generated by the second generation section 442 are used for a sub-field image of a pixel in which respective gray level values of the colors of R, G, and B are over preliminarily determined threshold values. For example, in a case the conditions indicated below are all satisfied, it can be determined that gray level values calculated by the second generation section 442 are used:

Rin>R_threshold;

Gin>G_threshold;

Bin>B_threshold; and the backlight is turned off

Here, "R_threshold", "G_threshold", and "B_threshold" are preliminarily determined threshold values for the respective colors of R, G, and B. The display data determination section 443, however, may make the foregoing determination simply based on whether the backlight is in OFF state or not, without making the comparison of these gray level values (Rin, Gin, Bin) of the colors of R, G, and B with the threshold values.

According to the determination of the display data determination section 443, the selector 444 selects which is to be outputted, either the gray level values of the first generation section 441, or the gray level values of the second generation section 442. In this example, regarding each pixel, the gray level values of the first generation section 441 or the gray level values of the second generation section 442 are selected and output. The configuration of the display data determination section 443 and the selector 444, however, is not limited to that of this example. For example, only based on the ON state or the OFF state of the backlight, for each image in one frame period, either the sub-field image of the first generation section 441 or the sub-field image of the second generation section 442 may be selected and output.

According to the above-described configuration, in the color display mode in which the backlight 12 is turned on and a color image is displayed, the sub-field of the mixed color W is inserted, and the gray levels of the sub-fields of the colors of R, G, and B are changed according to the foregoing sub-field of the mixed color W, whereby color breakup can be reduced. In the transmitted light image display mode in which display is performed with the backlight 12 being in OFF state, if the gray levels of the sub-field images of the colors of R, G, and B are changed in an identical manner as that described above, the transparency decreases in some cases. The configuration, therefore, may be such that the gray level values of the sub-fields of the colors of R, G, and B are not changed in the transmitted light image display mode, whereby the transparency of the pixels of transparent display can be ensured.

For example, in a case where the colors of R, G, and B are represented by eight bits and white (R, G, B)=(255, 255, 255) is assumed to be transparent display, when a sub-field image corresponding to the conventional mixed color W is inserted, it has a gray level of "0" in the RGB sub-field image, which causes the transparency while the backlight is in OFF state to decrease. Further, if the RGB sub-field remains having a gray level of "255" even when the sub-field of the mixed color W is inserted, color breakup tends to occur when the backlight is turned on and color display is performed. To cope with this, in the above-described example, when the backlight is in ON state, the data generation of the sub-fields of the colors of W, R, G, and B (the first generation section 441) is performed by a method that prioritizes the measures against color breakup, and when the backlight in OFF state, the data generation of the sub-fields of the colors of W, R, G, and B (the second generation section 442) is performed by a method that prioritizes transparency.

Incidentally, the sub-field image generation that is suitable for the color display mode and for the transmitted light image display mode is not limited to the example described above. For example, the first generation section 441 and the second generation section 442 may have a gray level value further lower than the above-described min(Rin, Gin, Bin) as the gray level value of the mixed color W. Further, the second generation section 442 may have gray level values of the colors of R, G, and B of the input image data V1 subjected to another correction, as gray level values of the sub-field image.

Further, as a modification of the embodiment in which the sub-field image generation processing in the color display mode and that in the transmitted light image display mode are different, the configuration may be, for example, such that the number of the sub-fields in one frame period, that is, the number of divisions of one frame period, in the color display mode is different from that in the transmitted light image display mode. For example, in the transmitted light image display mode, since the backlight 12 remains in OFF state during one frame period, the number of the sub-field may be 1 or 2. In this case, the gray level values of the sub-field image can be determined based on the gray level values of the colors of R, G, and B of the input image data V1.

Embodiment 2

Figure 9:
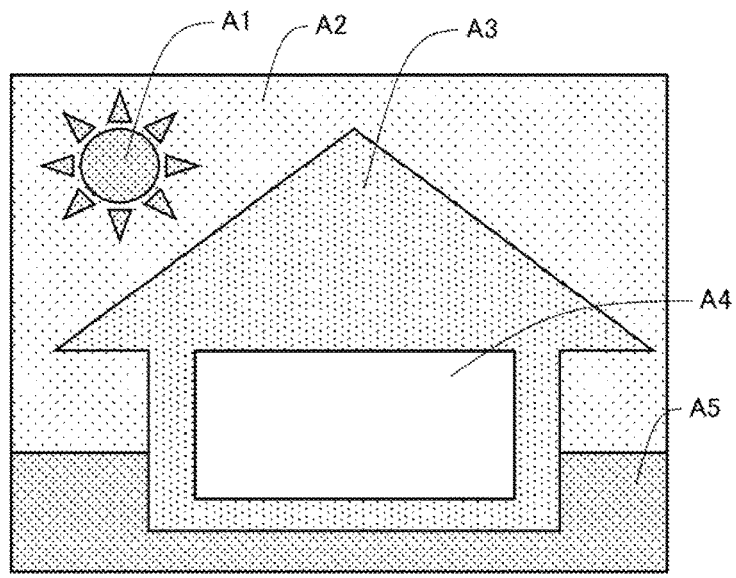
FIG. 9 illustrates an exemplary display image in the color display mode in Embodiment 2.
Figure 10:
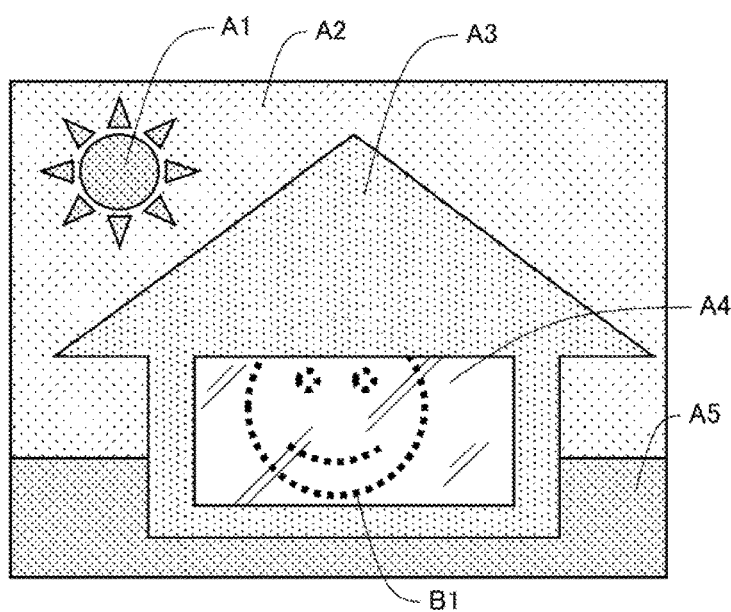
FIG. 10 illustrates an exemplary transmitted light image display mode.

FIG. 9 illustrates an exemplary display image in the color display mode in Embodiment 2. FIG. 10 illustrates an exemplary transmitted light image display mode. The display image in FIG. 9 and the display image in FIG. 10 are based on the same image data V1, and in the case of FIG. 9, the backlight 12 is in ON state, whereas in the case of FIG. 10, the backlight 12 is in OFF state. In the example illustrated in FIG. 9, therefore, as is the case with FIG. 4, the area A1 is displayed in red color, the area A2 is displayed in blue color, the area A3 is displayed in yellow color, the area A4 is displayed in white color, and the area A5 is displayed in green color. In the display image illustrated in FIG. 10, the areas A1, A2, A3, and A5 are displayed at gray scales corresponding to the gray level values of the colors of R, G, and B, and the area A4 is transparent. In other words, the area A4 becomes a transmitting region, and an object B1 behind the display device 10 is seen therethrough. In this example, an area that is a "white color display" area while the backlight 12 is in ON state becomes a "transparent display" area while the backlight 12 is in OFF state. Here, the gray level value of the white color display, and the gray level value of the transparent display are both equivalent to the gray level value that makes the transmittance highest in any of the colors of R, G, and B.

In this way, in the present embodiment, the backlight control circuit 16 can cause the backlight 12 to switch between the ON state and the OFF state, while the display control circuit 13 is causing the display panel 11 to display an image based on the same image data continuously during a plurality of frame periods.

For example, the display device 10 can receive the input of image data V1 of a still image, and the input of control data for the backlight 12 corresponding to the still image. In this case, the display control circuit 13 causes the display panel 11 to display the image of the same image data V1 during a plurality of frame periods. In each of the plurality of frame periods, backlight data that instruct the turning-on or the turning-off of the backlight 12 for each frame period are output from the backlight control circuit 16 to the backlight 12.

In the display device 10 of the present embodiment, a light guide plate 18 that becomes transparent while the backlight 12 is in OFF state is arranged on the back surface of the liquid crystal 24, whereby a pixel region for which the input image data indicate "white" becomes white display while the backlight 12 is in ON state, and becomes transparent display while the backlight 12 is in OFF state. The display device 10 configured in this way uses the same contents while the backlight 12 is in ON state and while the backlight 12 is in OFF state (the image data input to the display device 10 are the same), so as to perform color display while the backlight 12 is in ON state, and perform display in which the area that displays white when the backlight 12 is in ON state is transparent can be performed while the backlight 12 is in OFF state. This makes it possible to enhance the eye-catching effect.

The conventional display device performs color display while the backlight is in ON state, and when the backlight is turned off, either the display is completely invisible, or the display becomes monochrome display. In contrast, in the case of the display where the area that is "white display" when the backlight is in ON state becomes "transparent display" when the backlight is turned off as in the present embodiment, the while display area becomes transparent display, which allows an object behind the display to be visually observed. This enables, for example, the presentation that enhances the eye-catching effect, in digital signage and the like using the display device 10.

Further, in a case where the area A4 is moved vertically and horizontally to be displayed in the image illustrated in FIG. 9, merely a vision of a moving white rectangle is obtained in the conventional display. In contrast, in a case of a configuration in which the white color display area (A4) becomes transparent display when the backlight 12 is turned off as in the present embodiment, various parts of the back behind the display device 10 become visually observed (the visually observed area varies as the transparent display moves), which can enhance the presentation effect.

Modification Example (Exemplary Configuration in which Color Filters are Used)

Figure 11:
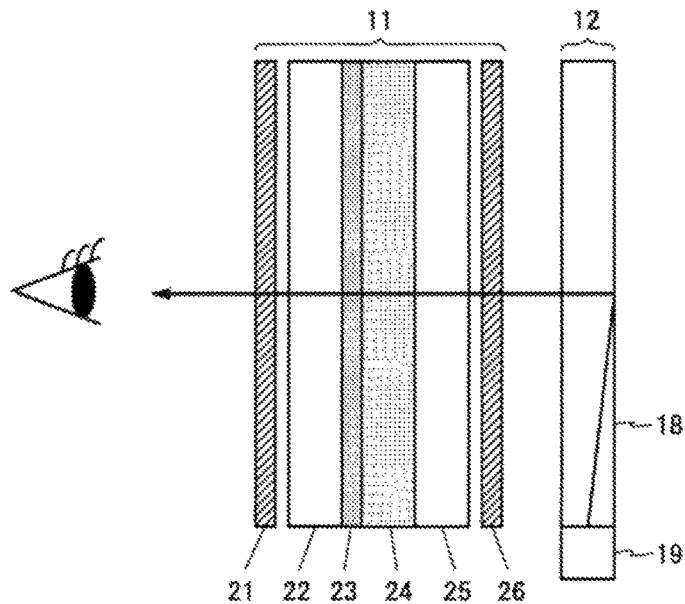
FIG. 11 is a cross-sectional view illustrating an exemplary configuration of a color filter type display device 10.

The embodiments of the present invention are not limited to the above-described embodiments. In the foregoing description of the embodiments, cases of the field sequential display device 10 are described, but the present invention can be applied to a display device 10 that includes color filters. In this case, in the transmitted light image display mode, a color image including a transmitting region can be displayed. FIG. 11 is a cross-sectional view illustrating an exemplary configuration of a color filter type display device 10.

In the example illustrated in FIG. 11, a color filter 23 and a common electrode (not shown) are provided on one of surfaces of a second substrate 22 (in the present example, on the liquid crystal 24 side surface). On a first substrate 25, three pixel circuits 17 arrayed in a direction in which gate lines G1 to Gm extend or in a direction in which source lines S1 to Sn extend function as a red (R) subpixel, a green (G) subpixel, and a blue (B) subpixel, respectively. These three pixel circuits 17 correspond to one color pixel. The (m×n) pixel circuits 17 included in the display panel 11 correspond to (m×n/3) color pixels. A light source 19 of a backlight 12 is, for example, may be a light source that emits white light. As the light source 19, for example, light-emitting diodes (LED) of three colors of R, G, and B, or cold-cathode tubes (cathode fluorescent lamps: CCFL) can be provided. The other configurations of the display device 10 can be identical to those in Embodiment 1 described above.

(Exemplary Configuration of Direct-Type Backlight)

Figure 12:
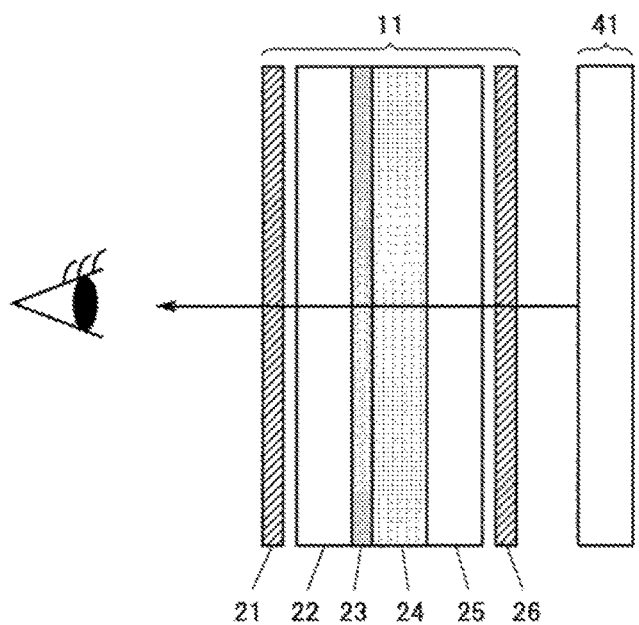
FIG. 12 is a cross-sectional view illustrating an exemplary configuration of a display device in which a direct-type backlight 41 is used.

The display device 10 can include a direct-type backlight, in place of the above-described edge light type backlight 12. FIG. 12 is a cross-sectional view illustrating an exemplary configuration of a display device in which a direct-type backlight 41 is used, which is a modification example of above-described Embodiments 1 and 2. In the example illustrated in FIG. 12, a part of the backlight 41 overlapping the display area of the display panel 11 is transparent. The backlight 41 has a configuration in which a transparent light source and a transparent substrate are used. As the transparent light source, for example, an organic electroluminescence (EL) or an inorganic EL can be used. Further, it is possible to form a substantially transparent LED backlight by arranging, on a glass or plastic substrate, a multiplicity of LEDs that are thin and small to such an extent that light for transparent display can pass therethrough. Examples of the transparent substrate configuration include a configuration in which the substrate itself is formed with a transparent material, and a configuration in which the substrate is formed with a thin film (for example, having a thickness of several nanometers or less) so that light can pass therethrough. In this way, the direct-type backlight 4 in which a part that overlaps the display area of the display panel 11 is transparent can be used.

(Application Example Other than Liquid Crystal Display Device)

Further, the display device to which the present invention can be applied is not limited to a liquid crystal display device. The present invention can be applied to another type of a display device (a display device other than a liquid crystal display device) that includes an illumination unit that projects light on one of surfaces of the display panel, and that has a function of allowing the back of the display screen to be seen therethrough. For example, the present invention can be also applied to a display device that includes a backlight and a display panel including a plurality of shutter elements that are arranged two-dimensionally and are capable of controlling an ON state for light transmission and an OFF state for light blocking pixel by pixel, in which the ON state and the OFF state of the shutter elements are switched according to bits of image data, respectively, several times per one frame period.

DESCRIPTION OF REFERENCE NUMERALS 4 image processing unit
10 display device
11 display panel
12 backlight
13 display control circuit
16 backlight control circuit
18 light guide plate
19 light source

The invention claimed is:

1. A display device comprising:
a light source;
a light guide plate having an incidence surface on which light from the light source is incident, and an emission surface from which the light from the light source, incident via the incidence surface, is emitted;
a display panel stacked on the emission surface of the light guide plate, the display panel displaying an image by controlling a transmittance of light incident thereon for each of a plurality of pixels;
a panel driver that outputs, to the display panel, a signal for controlling a transmittance of the display panel for each pixel, based on image data that indicate an image to be displayed on the display panel; and
a backlight control circuit that drives the light source,
wherein a back surface of the light guide plate is configured for a light to pass through, the back surface being a surface opposed to the emission surface,
the backlight control circuit drives the light source based on lighting control data that indicate whether or not the light source should be turned on when the image indicated by the image data is displayed, and
in a case where an image is displayed when the light source is in ON state, the display panel displays a color image, by controlling, pixel by pixel, a transmittance of light that passes from the light source through the emission surface of the light guide plate and is incident on the display panel, based on the signal of the panel driver, and in a case where an image is displayed when the light source is in OFF state, the display panel displays a transmitted light image that includes a transmitting region through which back of the display device can be seen, by controlling, pixel by pixel, a transmittance of light that passes through the back surface of the light guide plate and is incident on the display panel, based on the signal of the panel driver;
a sub-field generator that generates a plurality of sub-field images to be displayed during a plurality of sub-field periods, respectively, based on the image data, the sub-field periods being obtained by dividing one frame period,
wherein the light source is capable of emitting lights of a plurality of colors that are different from one another,
the panel driver outputs, to the display panel, a signal for causing the sub-field images to be sequentially displayed during the sub-field periods in one frame period, respectively, and
when the light source is turned on and the color image is displayed, the backlight control circuit switches the color of light to be emitted, every sub-field period;
wherein the sub-field generator generates a sub-field image corresponding to a mixed color of the plurality of colors, in addition to the sub-field images corresponding to the colors of the light source, respectively,
in the processing operation for generating the sub-field images of the image to be displayed with turning on the light source, the sub-field generator executes a processing operation for changing gray level values of sub-field images corresponding to the respective colors according to a gray level value of a sub-field image of the mixed color, and
in the processing operation for generating the sub-field images of the image to be displayed with turning off the light source, the sub-field generator does not execute the processing operation for changing the gray level values of the sub-field images corresponding to the respective colors according to the value of the sub-field image of the mixed color.

2. The display device according to claim 1,
wherein the image data contain respective gray level values of the pixels in the image to be displayed, and
a gray level value of the image data for causing the pixel to display white color in the display of the color image corresponds to a gray level value of a transmittance at which light from the back surface of the light guide plate passes through the pixel in the display of the transmitted light image.

3. The display device according to claim 1,
wherein the sub-field generator is configured to perform a processing operation for generating the sub-field images of the color image to be displayed with turning on the light source, and a processing operation for generating the sub-field images of the transmitted light image to be displayed with turning off the light source, in different ways.

4. The display device according to claim 1,
wherein the display panel displays the transmitted light image including the transmitting region and a black region exclusively, in a case of image display when the light source is in OFF state.

5. The display device according to claim 1, wherein the backlight control circuit switches the turning-on and the turning-off of the light source, while the panel driver is causing the display panel to display an image based on the same image data.

* * * * *